US007062750B2

(12) United States Patent
Whidby et al.

(10) Patent No.: US 7,062,750 B2
(45) Date of Patent: Jun. 13, 2006

(54) ACCESSING REMOTE STORES OF SOURCE AND SYMBOL DATA FOR USE BY COMPUTING TOOLS

(75) Inventors: Mark David Whidby, Woodinville, WA (US); Pat Styles, Seattle, WA (US); Barbara Lynne Kess, Sammamish, WA (US); Andre F. Vachon, Redmond, WA (US); Mohammad Jazayeri, Kirkland, WA (US); Danial George Neault, Redmond, WA (US); Douglas Seth Laundry, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 09/907,434

(22) Filed: Jul. 16, 2001

(65) Prior Publication Data

US 2003/0110264 A1     Jun. 12, 2003

(51) Int. Cl.
*G06F 9/44*     (2006.01)

(52) U.S. Cl. .................. 717/103; 717/124; 709/210; 709/217; 707/10

(58) Field of Classification Search .............. 717/100, 717/103, 175, 176, 177, 178, 107, 127, 124; 717/126; 707/101, 90, 202, 10; 709/228, 709/219, 227, 201, 225, 217, 203; 704/8
See application file for complete search history.

(56) References Cited

U.S. PATENT DOCUMENTS 5,664,206 A * 9/1997 Murow et al. ................ 704/8
5,778,231 A * 7/1998 van Hoff et al. ............ 717/143
5,933,829 A * 8/1999 Durst et al. .................. 707/10
5,978,850 A * 11/1999 Ramachandran et al. ... 709/228
6,055,538 A * 4/2000 Kessenich et al. .......... 707/101
6,192,408 B1 * 2/2001 Vahalia et al. .............. 709/229
6,208,991 B1 * 3/2001 French et al. ................ 707/10

(Continued)

OTHER PUBLICATIONS

Title: Authentication in the Taos Operating System, author: Wobber et al, ACM, 1993.*

(Continued)

*Primary Examiner*—Ohameli C. Das
(74) *Attorney, Agent, or Firm*—Law Offices of Albert S Michalik, PLLC (57) ABSTRACT

A system and method in which a remote network source maintains source code and symbol files for debugging purposes with automatic downloading of the correct files when they are needed. Files are remotely maintained based on unique data associated with that file (unique parameters) that are independent of the product name, release and/or build number. Such data includes time / date stamp information and file size, or signature and age data. When a given file is needed, such as to debug an executable code module, a symbol server at the client constructs a path (e.g., URL) to the needed file based on the unique information from the corresponding executable file, whereby the correct symbol file is accessed. Via that symbol file, the correct source file may be located and accessed. Security via authentication and access control lists may control access to the files, and authentication may be automatic.

25 Claims, 3 Drawing Sheets

U.S. PATENT DOCUMENTS

| | | | | |
|---|---|---|---|---|
| 6,292,802 | B1 * | 9/2001 | Kessenich et al. | 707/101 |
| 6,308,273 | B1 * | 10/2001 | Goertzel et al. | 713/201 |
| 6,324,683 | B1 * | 11/2001 | Fuh et al. | 717/124 |
| 6,405,366 | B1 * | 6/2002 | Lorenz et al. | 717/107 |
| 6,463,537 | B1 * | 10/2002 | Tello | 713/182 |
| 6,678,883 | B1 * | 1/2004 | Berry et al. | 717/128 |
| 6,694,510 | B1 * | 2/2004 | Willems | 717/124 |
| 6,904,449 | B1 * | 6/2005 | Quinones | 709/203 |

OTHER PUBLICATIONS

Title: Authentication in Distributed Systems: Theory and Practice, author: Lampson et al, ACM, 1991.*

Labenski, Robert, "MIKBUG and the TRS-80, Part 2: A File Transfer and Debugging Package", *BYTE Publications, Inc.*, pp. 100, 102, 103, 107, 108, 110 (Jan., 1982).

* cited by examiner

ACCESSING REMOTE STORES OF SOURCE AND SYMBOL DATA FOR USE BY COMPUTING TOOLS

FIELD OF THE INVENTION

The present invention relates generally to computers and networks, and more particularly to symbol-based computing tools such as debugging tools.

BACKGROUND OF THE INVENTION

A debugging tool is one type of computing tool, typically used to trace the execution of executable code for finding programming errors, or bugs. In order for a debugging tool to be useful, the developer using the tool needs to have access to the source code that was used to compile the executable code being debugged, along with the symbol data generated by the compilation process. Among other reasons, this is because when tracing a program's execution, a developer does not want to see the numerical address associated with a memory location, but instead wants to see the name (label) or the like assigned to that memory address in the source code. To this end, debugging tools merge files containing the source code and symbol data with the executable code being debugged, to present the code to the user with meaningful information. In this way, the developer can immediately relate the given name to a program step being executed, e.g., to recognize things such as what named routine is being called, what named variable is being written or read, and so on.

However, locating the correct symbol information for debugging or other purposes is a complicated problem. For example, when tracing a program's execution takes the developer into operating system code, the symbols for that operating system code are different for each revision, according to release or build number. As a result, in order to find the correct symbols for the particular operating system code being debugged, the developer must know or be able to find out the correct version releases of the operating system. The developer must also know or be able to determine the respective locations (path) for each set of symbol files.

Thus, to debug applications run on contemporary operating systems, a developer (or development team) needs to perform a substantial amount of setup work, which adversely impacts the debugging process. For example, application developers running applications on contemporary operating system code need to copy gigabytes of operating system source code, install thousands of symbol and source files onto the machine that is being used for debugging (or onto some local network share connected to that machine), setup their own operating system build environment, manage different versions of the platform, and perform many other administrative tasks necessary in a large software development project. As can be readily appreciated, not only does such setup complexity consume huge amounts of storage, (on the order of tens of gigabytes when the copied files are expanded and the environment built), but is extremely costly in terms of time.

Further, even after the developers set up their own build environment, they are still not able to fully utilize the source code. They must build (compile) the operating system in order to have the necessary operating system symbols for debugging their application, and this build may not match the retail product. Finally, after all this preparation, in many instances most of the installed symbol and source files are never actually needed.

In sum, there are numerous difficulties and drawbacks in working with a large amount of symbol files and/or source code files, yet in many cases, such as with contemporary operating systems, the many versions and platforms available need to be supported. Note that other symbol-based computing tools, such as performance monitoring tools, fault-injection tools, diagnostic tools and so on have similar problems.

SUMMARY OF THE INVENTION

Briefly, the present invention provides a system and method in which a remote network source maintains the source code and/or symbol files, and developers automatically receive only the source code and symbol files that are needed, at the time they are needed, with minimal (if any) user interaction. Because of the automatic (just-in-time / on demand) file location, the need for the developer to perform version management or construct a build environment is essentially eliminated. The symbol / source code file location process is essentially transparent to the developers.

Further, by maintaining the source code and symbol files remotely, and only providing files when needed, the present invention can better reduce distribution of the many files. Security can control access to the files. For example, the files can be arranged for downloading only to clients with the appropriate authentication credentials, such as clients with smart cards having valid certificates. Different files can have different security requirements as controlled at the remote server end. Each individual file can have its own associated security information, such as via access control lists, whereby in conjunction with client authentication, access can be controlled on a per file, per client basis.

In one implementation, the files are maintained at the remote server in a manner that allows them to be located from unique data associated with the file (unique parameters) that are independent of the product name, release and/or build number. To this end, the server constructs a path/filename from a file's time/date stamp and size of the file image, or signature and age data. To obtain the symbol file when needed during operation, the tool communicates with the symbol server, which in turn determines the name, and requests (e.g., via HTTP or HTTPS GET requests) access to the remote server website or the like that corresponds to the file. The client-side symbol server may automatically handle client authentication, such as by communicating with a cryptographic service provider to obtain a digital certificate from a smart card read at the client machine.

Other advantages will become apparent from the following detailed description when taken in conjunction with the drawings, in which:

DETAILED DESCRIPTION

Exemplary Operating Environment

Figure 1:
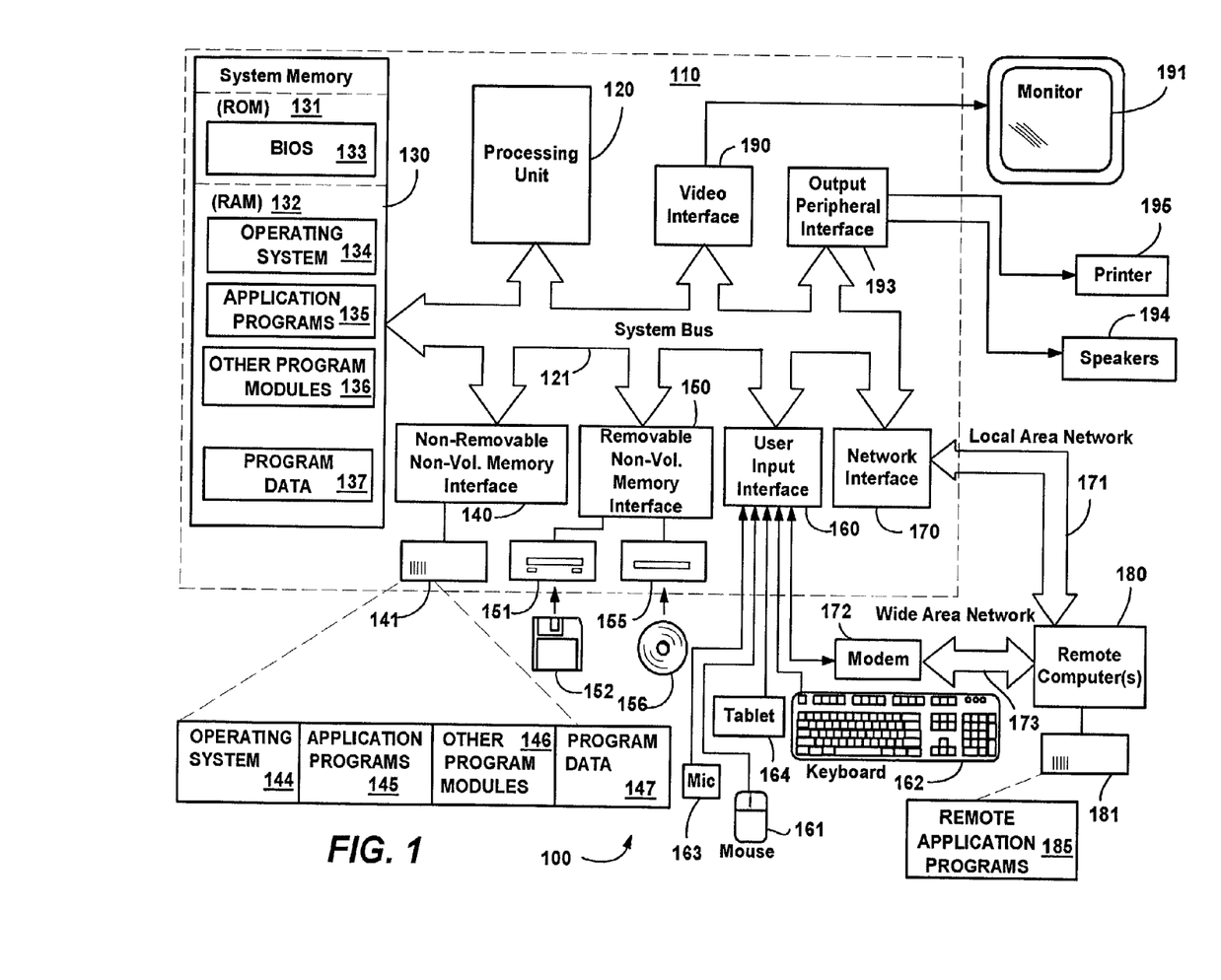
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer)

164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Accessing Remote Symbol and Source Code Stores

The present invention is generally directed to providing symbols to computing tools, such as debugging tools, over a remote connection to servers via the Internet. Notwithstanding, as will be understood, there is no intention to limit the present invention to debugging tools and/or the Internet, but as will be understood, the present invention provides numerous advantages and benefits to computing in general. For example, any program that works with symbols, such as a performance monitoring tool, fault injection tool, diagnostic tool and so forth may benefit from the present invention, as will be understood. As another example, while the Internet provides the ability to access the file by many users, worldwide, and thus is desirable in many situations, in other situations an Intranet setup may be more desirable.

Figure 2:
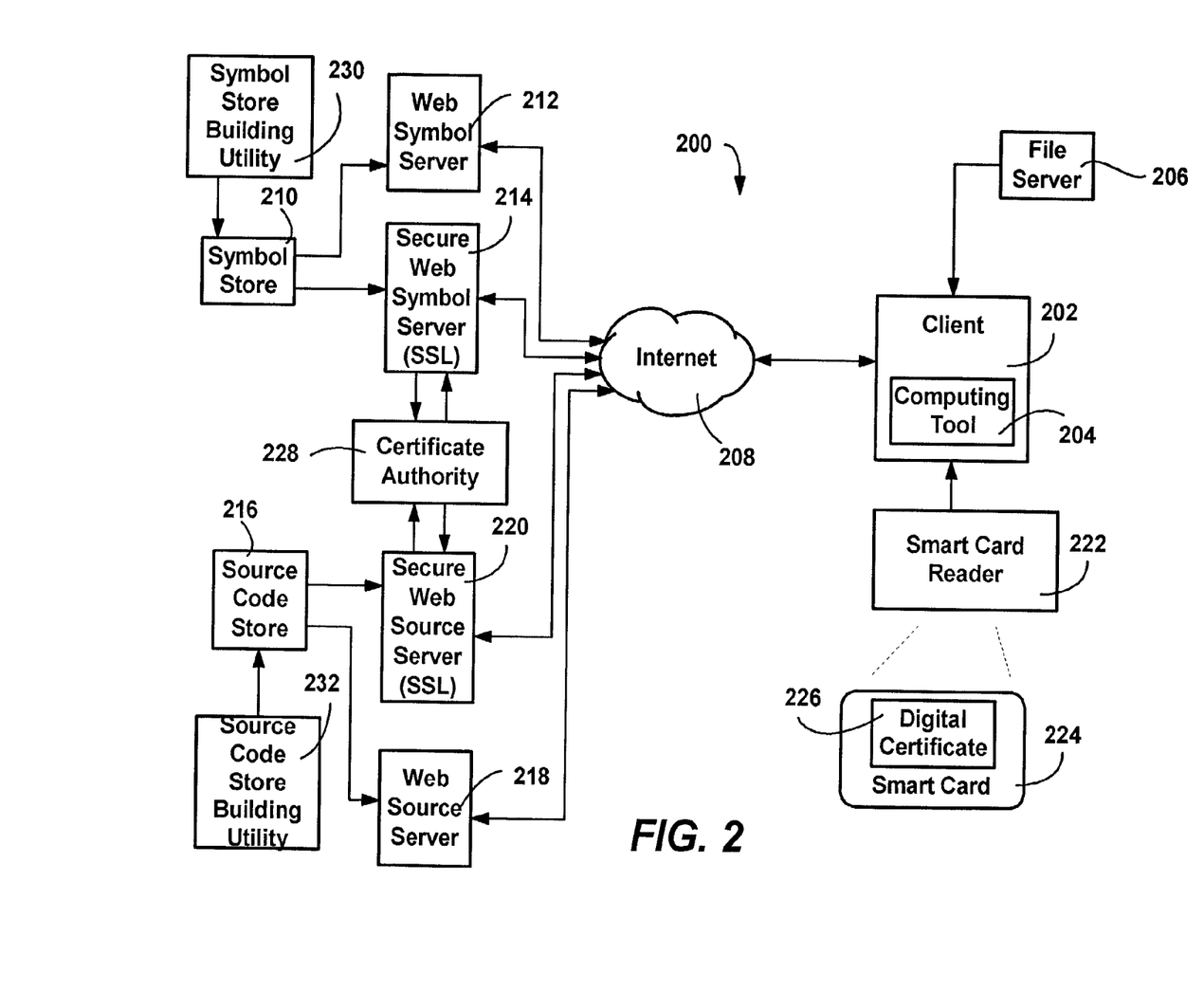
FIG. 2 is a block diagram generally representing a network for providing automatic, on demand access to remotely maintained symbol and/or source code files in accordance with one aspect of the present invention.

Turning to FIG. 2 of the drawings, various components of a networked computing environment 200 are represented in one configuration suitable for implementing the present invention. When a client computing system 202 (which may correspond to the computer system 110 of FIG. 1) is operating in the computing environment 200 and is running a symbol-based computing tool 204 such as a debugging tool, the client computing system 200 will want access to symbol data, normally maintained in symbol files. For purposes of simplicity herein, the present invention will be primarily described with reference to the tool 204 being a debugging tool, and in such a situation, the client computing system 200 will further want access to source code data, normally maintained in source code files. Although the symbol and source code files may be present in local storage, and/or on a network file server 206, the present invention is generally directed to eliminating the need for installing the many files, locally setting up a build environment, and managing the many versions of available files. Instead, the present invention provides the files and manages the builds and versions remotely, at a commonly accessible location for multiple users.

To this end, in one implementation, the symbols and/or source code can be obtained on demand over the Internet 208. The remotely maintained symbol files 210 may be accessed through a non-secure web symbol server 212 and/or a secure (e.g., SSL) web symbol server 214, with security depending on the preference of the symbol files' owner. Security may be per file, such as via an access control list (ACL) on each file.

Like the symbol files in the symbol store 210, source code files 216 are remotely maintained and may be accessed through a non-secure web source code server 218 and/or a secure (e.g., SSL) web symbol server 220. Again, security depends on the preference of the symbol files' owner, and security may be per source code file, such as via ACLs.

Various types of authentication may be required to obtain access to the files, such as client-server password authentication, or certificate authentication via a smart card or the like. FIG. 2 shows the client machine 202 connected to a smart card reader 222, for reading a smart card 224 having a certificate 226 therein that is checked at a certificate authority 228. Certificate authentication used with remote symbol file access is described below with respect to FIG. 3.

In accordance with one aspect of the present invention, the many symbol files and source code files are arranged on the server in a way that facilitates their access by remote clients. To this end, a symbol store such as the store 210 may be built by executing a symbol store building utility program 230 (e.g., executed on a remote computer such as the computer hosting the web server 212, or another computer). In one implementation, the utility 230 stores debug (DBG) and program database (PDB) symbol files in a format which enables code at the client to look up the symbols based on the time/date stamp and size of the file image (DBGs), or signature and age data (PDBs). PDB files hold debugging and project state information, and provide the information needed for incremental linking of debug program versions. Note that public and private PDB symbol files cannot be stored on the same server because they may each contain the same signature and age. The utility 226 can also store executable images using the same keys as used for DBG files.

Traditionally, symbols have been stored on a per product basis, with one directory for each executable extension (e.g., DLL or EXE files). In keeping with the present invention, the advantage of the computed storage format over such traditional symbol storage format is that the various symbols can be stored or referenced on the same server, and retrieved by the client, without any prior knowledge of which product contains the desired symbol.

To arrange and manage the files in the desired format, in one implementation, server administration is accomplished by adding and deleting transactions, and each call to add to or delete from the symbol store is recorded as a transaction. To accomplish this, when the web symbol server is created, a directory under the root of the server is created, e.g., named "000admin". This directory contains, for example, a file named "server.txt", another named "history.txt", and one file for each transaction. The file named server.txt contains a list of all the transactions that are currently on the server, while the file history.txt contains a chronological history of the add and delete transactions.

Each time that the symbol store utility 226 is called to add or delete files, a new transaction number is created, and a file is created in the "000admin" directory whose name comprises this transaction number. If adding files, this transaction file contains a list of the files or pointers that have been added to the symbol server during this transaction. If a transaction is deleted, the symbol store utility 226 will read through its transaction file to know which files and pointers it should delete. When a transaction is added, several items of information are added to the server.txt and history.txt files to enable future lookup abilities. The following is an example of a line in server.txt and history.txt for an add transaction, with the fields separated by commas and described in the table below:

---

0000000096,add,ptr,10/09/99, 00:08:32,Windows NT 4.0 SP 4,x86 fre 1.156c-RTM-2,Added from \\ntbuilds\release,
    Add Field description:
| | |
|---|---|
| 0000000096 | Transaction ID number - created by the utility |
| add | Type of transaction - values are either "add" or "del" |
| ptr | Whether files or pointers were added - values are either "file" or "ptr" |
| 10/09/99 | Date transaction occurred |
| 00:08:32 | Time transaction started |
| Windows NT | Product - entered from the command line with /t option |
| x86 fre | Version - entered from the command line with /v option (optional) |
| Added from | Comment - entered from the command line with /c option (optional) |
| Unused | Final field in the record - reserved for later use |

---

The following table sets forth example lines from the transaction file 0000000096. Each line records the directory and the location of the file or pointer that was added to the directory:

--- canon800.dbg\35d9fd51b000,\\ntbuilds\release\usa\svcpack\sp4\1.156
    c-RTM-2\support\debug\i386\symbols\dll\canon800.dbg
canonlbp.dbg\35d9fd521c000,\\ntbuilds\release\usa\svcpack\sp4\1.15
    6c-RTM-2\support\debug\i386\symbols\dll\canonlbp.dbg
certadm.dbg\352bf2f48000,\\ntbuilds\release\usa\svcpack\sp4\1.156c
    -RTM-2\support\debug\i386\symbols\dll\certadm.dbg
certcli.dbg\352bf2f1b000,\\ntbuilds\release\usa\svcpack\sp4\1.156c
    -RTM-2\support\debug\i386\symbols\dll\certcli.dbg
certcrpt.dbg\352bf04911000,\\ntbuilds\release\usa\svcpack\sp4\1.15
    6c-RTM-2\support\debug\i386\symbols\dll\certcrpt.dbg
certenc.dbg\352bf2f7f000,\\ntbuilds\release\usa\svcpack\sp4\1.156c
    -RTM-2\support\debug\i386\symbols\dll\certenc.dbg

---

If this transaction is deleted it will be removed from server.txt and the following line will be added to history.txt:
    0000000105,del,0000000096

The fields for the del transaction are set forth in the following table:

---

Delete Field description:
| | |
|---|---|
| 0000000105 | Transaction ID number - created by symstore |
| del | Type of transaction |
| 0000000096 | Transaction that was deleted |

---

The web symbol server essentially uses the file system as a database. For the first directory level under the root, a subdirectory is created for each unique file name, e.g., f:\symsrv\foo.dbg, f:\symsrv\foo.pdb. For DBG files, the second subdirectory is the time / date stamp followed by the image size, while for PDBs, the second subdirectory is the signature followed by the age. For example, after several different ACPI.DBGs have been added to the server, the directories may look as in the table below:

| Directory of \\ntstress\symsrv\acpi.dbg: | | | |
|---|---|---|---|
| 10/06/1999 | 05:46p | <DIR> | . |
| 10/06/1999 | 05:46p | <DIR> | .. |
| 10/04/1999 | 01:54p | <DIR> | 37cdb03962040 |
| 10/04/1999 | 01:49p | <DIR> | 37cdb04027740 |
| 10/04/1999 | 12:56p | <DIR> | 37e3eb1c62060 |
| 10/04/1999 | 12:51p | <DIR> | 37e3ebcc27760 |
| 10/04/1999 | 12:45p | <DIR> | 37ed151662060 |
| 10/04/1999 | 12:39p | <DIR> | 37ed15dd27760 |
| 10/04/1999 | 11:33a | <DIR> | 37f03ce962020 |
| 10/04/1999 | 11:21a | <DIR> | 37f03cf7277c0 |
| 10/06/1999 | 05:38p | <DIR> | 37fa7f00277e0 |
| 10/06/1999 | 05:46p | <DIR> | 37fa7f01620a0 |

Thus, the lookup path for the ACPI.DBG, with a time and date stamp of 37cdb0396 and image size of 2040 is \\ntstress\symsrv\acpi.dbg\37cdb03962040. Note that the lookup directory may include three files. First, if the file was stored, then "ACPI.DBG" will be present. Second, if a pointer was stored, then a file called "file.ptr" will exist and contain the path to the file. Third, a file called "refs.ptr" contains a list of the current locations for ACPI.DBG with this time / date stamp and image size that are currently added to the symbols server.

The directory of \\ntstress\symsrv\acpi.dbg\37cdb03962040 may thus include the following information:

| | | | |
|---|---|---|---|
| 10/04/1999 | 01:54p | 52 | file.ptr |
| 10/04/1999 | 01:54p | 67 | refs.ptr |

The contents of file.ptr is the text string \\ntstress\symbols\x86\2128.chk\symbols\sys\acpi.dbg. Since there is no file called "ACPI.DBG" in this directory, the debugger will try to find the file at another location, \\ntstress\symbols\x86\2128.chk\symbols\sys\acpi.dbg. The contents of refs.ptr is used only by the utility, not the debugger. Its contents are:
    0000000026,ptr,\\ntstress\symbols\x86\2128.chk\
    symbols\sys\acpi.dbg This shows that a ptr to \\ntstress\symbols\x86\2128.chk\symbols\sys\acpi.dbg was added with the transaction numbered 0000000026.

Some symbol files stay constant through various products or builds or a particular product. One example of this is msvcrt.pdb. Thus, reading the directory of \\ntstress\symsrv\msvcrt.pdb shows that only two versions of msvcrt.pdb have been added to the symbols server:

| Directory of \\ntstress\symsrv\msvcrt.pdb | | | |
|---|---|---|---|
| 10/06/1999 | 05:37p | <DIR> | . |
| 10/06/1999 | 05:37p | <DIR> | .. |
| 10/04/1999 | 11:19a | <DIR> | 37a8f40e2 |
| 10/06/1999 | 05:37p | <DIR> | 37f2c2272 |

However, reading the directory of \\ntstress\symsrv\msvcrt.pdb\37a8f40e2 shows that refs.ptr has several pointers in it:

| Directory of \\ntstress\symsrv\msvcrt.pdb\37a8f40e2: | | | |
|---|---|---|---|
| 10/05/1999 | 02:50p | 54 | file.ptr |
| 10/05/1999 | 02:50p | 2,039 | refs.ptr |

The contents of \\ntstress\symsrv\msvcrt.pdb\37a8f40e2\refs.ptr is the following:

```
0000000001,ptr,\\ntstress\symbols\x86\2137\symbols\dll\msvcrt.pdb
0000000002,ptr,\\ntstress\symbols\x86\2137.chk\symbols\dll\msvcrt.pdb
0000000003,ptr,\\ntstress\symbols\x86\2138\symbols\dll\msvcrt.pdb
0000000004,ptr,\\ntstress\symbols\x86\2138.chk\symbols\dll\msvcrt.pdb
0000000005,ptr,\\ntstress\symbols\x86\2139\symbols\dll\msvcrt.pdb
0000000006,ptr,\\ntstress\symbols\x86\2139.chk\symbols\dll\msvcrt.pdb
0000000007,ptr,\\ntstress\symbols\x86\2140\symbols\dll\msvcrt.pdb
0000000008,ptr,\\ntstress\symbols\x86\2140.chk\symbols\dll\msvcrt.pdb
0000000009,ptr,\\ntstress\symbols\x86\2136\symbols\dll\msvcrt.pdb
0000000010,ptr,\\ntstress\symbols\x86\2136.chk\symbols\dll\msvcrt.pdb
0000000011,ptr,\\ntstress\symbols\x86\2135\symbols\dll\msvcrt.pdb
0000000012,ptr,\\ntstress\symbols\x86\2135.chk\symbols\dll\msvcrt.pdb
0000000013,ptr,\\ntstress\symbols\x86\2134\symbols\dll\msvcrt.pdb
0000000014,ptr,\\ntstress\symbols\x86\2134.chk\symbols\dll\msvcrt.pdb
0000000015,ptr,\\ntstress\symbols\x86\2133\symbols\dll\msvcrt.pdb
0000000016,ptr,\\ntstress\symbols\x86\2133.chk\symbols\dll\msvcrt.pdb
0000000017,ptr,\\ntstress\symbols\x86\2132\symbols\dll\msvcrt.pdb
0000000018,ptr,\\ntstress\symbols\x86\2132.chk\symbols\dll\msvcrt.pdb
0000000019,ptr,\\ntstress\symbols\x86\2131\symbols\dll\msvcrt.pdb
0000000020,ptr,\\ntstress\symbols\x86\2131.chk\symbols\dll\msvcrt.pdb
0000000021,ptr,\\ntstress\symbols\x86\2130\symbols\dll\msvcrt.pdb
0000000022,ptr,\\ntstress\symbols\x86\2130.chk\symbols\dll\msvcrt.pdb
0000000023,ptr,\\ntstress\symbols\x86\2129\symbols\dll\msvcrt.pdb
0000000024,ptr,\\ntstress\symbols\x86\2129.chk\symbols\dll\msvcrt.pdb
0000000025,ptr,\\ntstress\symbols\x86\2128\symbols\dll\msvcrt.pdb
0000000026,ptr,\\ntstress\symbols\x86\2128.chk\symbols\dll\msvcrt.pdb
0000000027,ptr,\\ntstress\symbols\x86\2141\symbols\dll\msvcrt.pdb
0000000028,ptr,\\ntstress\symbols\x86\2141.chk\symbols\dll\msvcrt.pdb
0000000029,ptr,\\ntstress\symbols\x86\2142\symbols\dll\msvcrt.pdb
0000000030,ptr,\\ntstress\symbols\x86\2142.chk\symbols\dll\msvcrt.pdb
```

This shows that the same msvcrt.pdb was used for multiple builds of symbols for Windows 2000 stored on \\ntstress\symsrv.

The following is an example of a directory that contains a mixture of file and pointer additions:

| Directory of E:\symsrv\dbghelp.dbg\38039ff439000 | | | |
|---|---|---|---|
| 10/12/1999 | 01:54p | 141,232 | dbghelp.dbg |
| 10/13/1999 | 04:57p | 49 | file.ptr |
| 10/13/1999 | 04:57p | 306 | refs.ptr |

In this case, refs.ptr includes the following contents:

```
0000000043,file,e:\binaries\symbols\retail\dll\dbghelp.dbg
0000000044,file,f:\binaries\symbols\retail\dll\dbghelp.dbg
0000000045,file,g:\binaries\symbols\retail\dll\dbghelp.dbg
0000000046,ptr,\\foo\bin\symbols\retail\dll\dbghelp.dbg
0000000047,ptr,\\foo2\bin\symbols\retail\dll\dbghelp.dbg
```

Thus, the transactions 43, 44, 45 added the same file to the server, while transactions 46, 47 added pointers. If transactions 43, 44, 45 are deleted, then the file dbghelp.dbg is deleted from the directory. The directory thus will have the following contents:

| Directory of e:\symsrv\dbghelp.dbg\38039ff439000 | | | |
|---|---|---|---|
| 10/13/1999 | 05:01p | 49 | file.ptr |
| 10/13/1999 | 05:01p | 130 | refs.ptr |

File.ptr now contains:
\\foo2\bin\symbols\retail\dll\dbghelp.dbg, and refs.ptr now contains:
0000000046,ptr,\\foo\bin\symbols\retail\dll\dbghelp.dbg
0000000047,ptr,\\foo2\bin\symbols\retail\dll\dbghelp.dbg When the utility is deleting a pointer from a directory, and the last entry in refs.ptr is a file, then it deletes "file.ptr." If the last entry was a pointer, then it copies the last pointer into file.ptr. If the utility is deleting a file from a directory, the file is deleted if no previous entries added the file. If the last entry added was a pointer, then the pointer is copied into file.ptr.

The following are examples of adding symbol pointers for build 1948 of Windows 2000 to \\foo\symsrv:

symstore add /r /p If \\ntbuilds\release\usa\1948\x86\fre.wks\symbols\reta il\*.* /s \\foo\symsrv /t "Windows 2000" /v "Build 1948 x86 fre" /c "Sample add"

symstore add /r /p /f \\ntbuilds\release\usa\1948\x86\chk. wks\symbols\reta il*.* /s \\foo\symsrv /t "Windows 2000" /v "Build 1948 x86 chk" /c "Sample add"

The following example adds the actual symbol files for an application project in \\largeapp\bins to \\foo\symsrv:

symstore add /r /f \\largeapp\bins\*.* /s \\foo\symsrv /t "An Application" /v "Build 432" /c "Sample add"

As can be appreciated, since the client knows the details of the executable file it is debugging, e.g., its size and time / date stamp, to access the file on the server, the client only needs to know the appropriate server path, i.e., the website's URL or the like. As can be readily appreciated, such information may be distributed to developers in virtually any way. With this path information, the client can provide the information needed to locate the exact symbol file on the website, via an HTTP (or HTTPS) request with an appropriate URL. In one implementation, the debugging tool automatically locates the appropriate symbol file, (e.g., the URL thereto), when needed, by communicating with a client side symbol server, as described below. As a result, the developer debugging an executable need not deal with determining the appropriate version of a needed symbol file, or finding a path thereto, and so on.

The source code file store 216 may be set up using a similar scheme. In general, the source code files also need to be uniquely identifiable. Although there are many ways for clients to access the source code files, (e.g., by submitting a query to a program that actively maintains the source code files, or to a database retrieval-type mechanism), in general, information in or associated with each symbol file points to its corresponding source code file, whereby a client that possesses the symbol file has or can easily derive the network path (URL) to the source code file.

Figure 3:
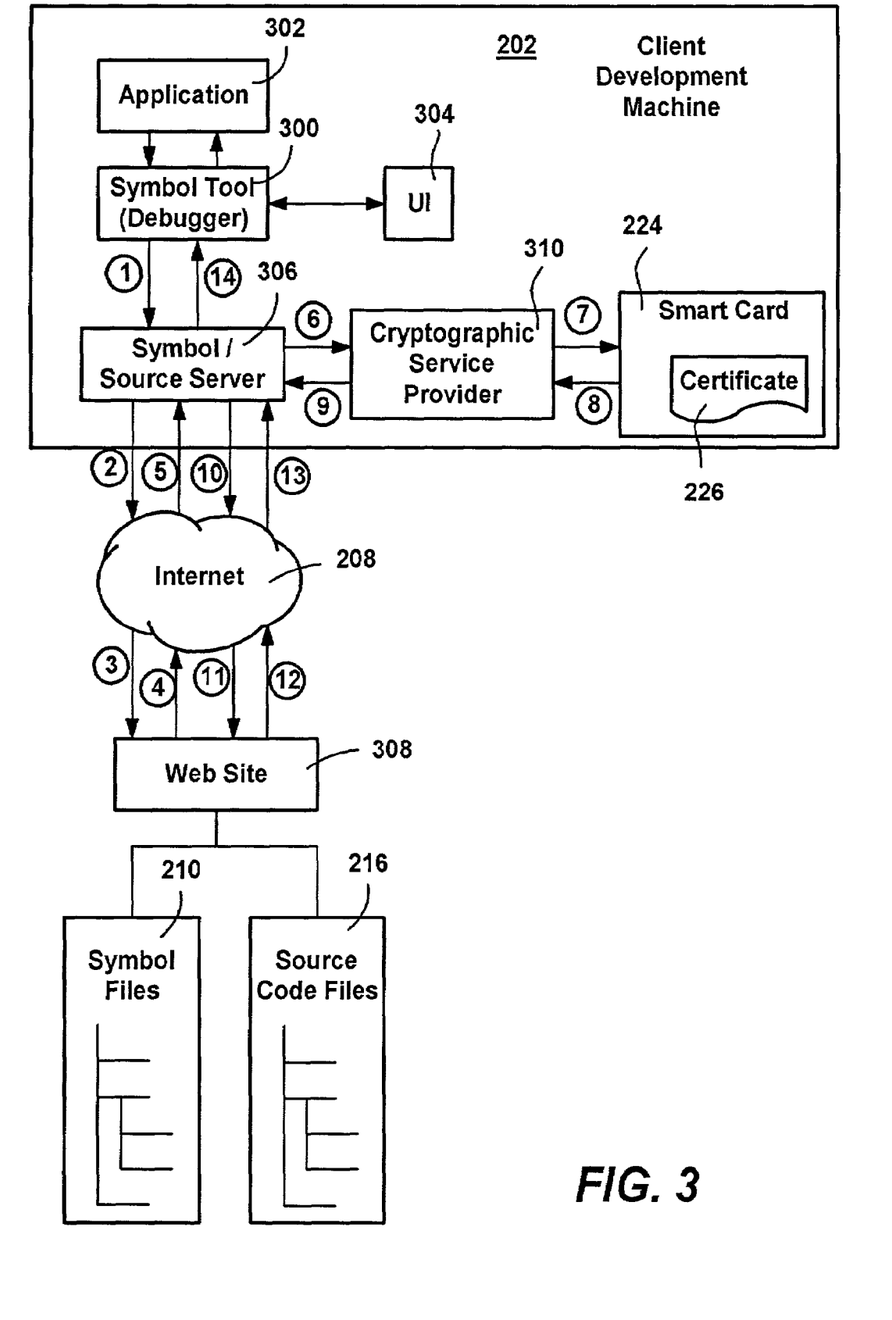
FIG. 3 is a block diagram generally representing components and a process therein for providing automatic, on demand access to remotely maintained symbol and/or source code files in accordance with one aspect of the present invention.

Turning to FIG. 3 of the drawings, various components and a general process therein for accessing the symbol and source code files are represented. In general, a debugging tool (engine) 300 runs below an application 302 or the like. The debugging tool 300 provides a graphical user interface 304 or the like to the developer.

As described above, the client may locate symbol information for debugged modules by reading information directly from the executable code (images) to point to the symbol files. While this may be implemented in the debugging tool 300 and work well for debugging applications on the actual development system, it is not adequate to handle debugging in other scenarios, including kernel mode debugging and user mode debugging on non-development systems wherein the development environment is not available for extraction of symbol-related data.

To provide transparent, on demand debugging in these and other scenarios, a client-side symbol / source code server 306 is provided that knows how to find each file maintained in the symbol store 210 (FIG. 2). As described above, this may be accomplished using unique parameters that are independent of the product name, release and/or build number. To this end, in one implementation a symbol server creates a fully qualified UNC path to the desired symbol file by starting with the path to the symbol store as passed in from an _NT_SYMBOL_PATH environment variable. Reading parameters passed thereto (e.g., from a debugging tool), the symbol server appends the name of the desired file as a directory name. Appended to that is another directory name created by concatenating the hexadecimal text string equivalents of three parameters, described below. A symbol server and its operation are also described in U.S. patent application Ser. No. 09/670,073, assigned to the assignee of the present invention.

In general, the symbol / source code server 306 can be installed through an installation that copies a DLL file, sets environment values and other information. Alternatively, the symbol / source code server 306 may be installed by a developer via instructions in a text file.

To use the symbol / source code server 306, in one implementation, the symbol / source code server 306 may be engaged by adding an entry to a value in the _NT_SYMBOL_PATH or _NT_ALTERNATE_SYMBOL_PATH environment variables (known ways in which to provide path information). To set a path, a value is added between semicolons, just as any other path might be added, or conversely it could take up the entire variable, if, for example, it is desired to use only the server for the location of symbols. Furthermore, multiple entries can be added to direct the symbol / source code server 306 to look in multiple locations for a symbol file. These entries can be placed in any order within the symbol path, allowing the debugging tool 300 to first look in some path location, and then check the symbol server 306, or whatever order is desired. The syntax for server entry in these variables may use two asterisks to parse the parameters, with trailing asterisks ignored:

SYMSRV*FOO.DLL*DATA wherein in this example, SYMSRV comprises a literal text string that indicates to the debugging tool 300 to call the symbol / source code server 306, and FOO.DLL is the name of the server DLL to load. "DATA" is server-specific information that tells the server where or how to look for symbols, and will be passed to the DLL when called.

The symbol / source code server 306 thus includes code for communicating with the debugging tool 300 to locate the symbol file for it. To this end, anytime the debugging tool 300 tries to load symbols for a newly loaded module, it may call the symbol / source code server 306 with a certain set of variables to help the symbol / source code server 306 locate the appropriate symbol file or files, e.g., compute the URL. The symbol / source code server 306 may return a validated path to the requested file, or the file data itself. One way in which this may be implemented is via the following API provided by the symbol server 306:

```
BOOL
SymbolServer (
    IN PCSTR params,
    IN PCSTR filename,
    IN DWORD one,
    IN DWORD two,
    IN DWORD three,
    OUT PSTR path
    )
``` wherein params comprises a text string in which server-specific information is passed, to identify to the server which store to use in the location of symbols, and filename specifies the name of the symbol file to return. One, two and three are three generic identifying parameters, (described below), while path specifies a text buffer allocated to a size of _MAX_PATH in which the symbol server is to copy the fully qualified path to the returned symbol file. The generic parameters are filled in according to the information being sought. More particularly, if the debugging tool 300 is looking for a DBG file, parameter one will contain the time / date stamp of the original image as found in its header. Parameter two will contain a SizeOfImage field, also extracted from the header. Parameter three is unused and will be zero.

Alternatively, if the debugging tool 300 is looking for a PDB file, parameter one will contain the PDB signature as found in the codeview debug directory of the original image, while parameter two will contain the PDB age and parameter three will be zero. Lastly, if the debugging tool 300 is looking for any other type of image, such as an actual executable file, it is likely being called through a FindFileInSearchPath() API. In this case, the parameters are not available to the debugging tool 300. However, if this API is being used to retrieve an executable file, it is expected that the parameters will be filled in as for a DBG file, using time / date stamp and size (metadata) of the image, which are known, as parameters.

Based on the information, the symbol / source code server 306 attempts to access the symbol file. It may do so locally or from a network share, but in keeping with the present invention, wherein local and network share setup typically will not be performed, the symbol / source code server 306 typically will attempt access remotely over the Internet, as generally shown in FIG. 2. If the symbol / source code server 306 locates a valid symbol file, the called API returns TRUE, otherwise it returns FALSE and sets an errorcode value to indicate why the symbol file was not returned. The symbol / source code server 306 may provide the validated path to the debugging tool so it can download the symbol file, or may directly provide the symbol file contents, such as via an HTTP GET request.

Once the file contents itself are obtained, to locate the source code file, the debugging tool 300 can similarly communicate with the symbol / source code server 306. Note that a symbol server may be implemented as a separate component from a source code server, but are shown as a single component herein. In any event, once the symbol file has been retrieved, the debugging tool can call a similar API of the symbol / source code server 306, e.g., providing the symbol file information. The symbol / source code server 306 may then extract the necessary location information from the symbol file, and attempt to access the source code file in generally the same way, including from the remote source code server 218 or 220.

In accordance with another aspect of the present invention, the symbol / source code server 306 is arranged to handle client authentication, again making the debugging process as automatic as possible. Depending on the type of security in place, this may be done by providing a user interface (e.g., a prompt to obtain a password) at a necessary time when requesting connection to the remote server. FIG. 3 shows an example in which certificate authentication is required, e.g., via a client smart card 224.

As described above, when the debugging tool 300 needs a remote symbol file, the debugging tool 300 calls the symbol / source server 306, as generally described above. This is represented in FIG. 3 via the arrow accompanied by circled numeral one (1). If the symbol / source server 306 determines that the file is to be remotely accessed, the symbol / source server 306 constructs a URL, routed via an HTTP or HTTPS request on the Internet 208 to an appropriate server website 308, represented in FIG. 3 via the arrows labeled two (2) and three (3).

In the present example, the web site 308 is a secure website, and thus instead of providing access, the remote server returns a challenge to the symbol / source server 306, represented in FIG. 3 via the arrows labeled four (4) and five (5). In response to the challenge, as represented via the arrow labeled six (6), the symbol / source server 306 contacts a cryptographic service provider 310 (available with contemporary operating systems), which in turn communicates with the smart card reader 222 (FIG. 2) to obtain and return the digital certificate data 336 of the smart card 224 (arrows seven (7) eight (8) and nine (9)).

With the certificate, the symbol / source server 306 again requests access to the file identified via an HTTPS request identifying the URL. If the certificate is valid, (e.g., as validated by the certificate authority 228 of FIG. 2), and the client is otherwise entitled to access the requested symbol file, the symbol / source server 306 will receive access to the symbol file (or a validated path thereto) in return, as generally represented in FIG. 3 via circled arrows ten (10) through thirteen (13). The symbol / source server 306 returns success to the debugger tool 300, along with any information needed to access the file's contents, as represented by the arrow labeled fourteen (14). Note that the file may be cached or otherwise copied to a local or file server storage for future use. Further, note that the file data may be compressed at the server and decompressed when received (e.g., by the / source server 306 or other component called thereby) to reduce network transmission time and load.

The source code file may be located via information in or associated with the symbol file, e.g., the files can be arranged with the same paths and names, but on different servers. Alternatively, the symbol file path can be used (e.g., a unique hash) in a database query or the like to retrieve the symbol file or path thereto, or the symbol file can contain various unique information therein from which the symbol file can be derived. In any event, once the path to the source code file is known, the source code file may be obtained in a similar manner, although the symbol / source server 306 may reuse the certificate information if the same card 224 is still present in the reader.

In this manner, whenever files are needed, they are automatically located and/or downloaded, including handling authentication, whereby a developer is freed from virtually all of the details related to symbol and source code file management and selection, and can concentrate on the actual task of using the symbol-based tool for debugging, performance monitoring and so on.

Note that because the authentication mechanism identifies the requesting client, the servers can be set up to provide different levels of access for various clients via ACLs or the like associated with each file. For example, full access to all symbol and source code files can be made available to certain client developers, while other client developers receive only a subset of the files, e.g., those related to some aspect of an operating system, such as networking code. In this manner, access to the source code and symbols may be better controlled. Indeed, while certain code may be completely unprotected if desired, such as by placing it on a website that does not require authentication and not restricting access via ACLs, other code can be carefully guarded via certificate authentication and an ACL that grants access to only a very limited number of clients.

As can be seen from the foregoing detailed description, there is provided a system and method for facilitating automatic access to remote symbol and/or source code files. The remote files may be arranged with unique locations that can be derived by a client-side symbol server from unique information associated with executable or other files. Authentication may be handled transparently to further enhance the automatic access.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method comprising:
receiving a request at a client to locate a symbol file during a debugging operation implemented at the client;
determining a remote location at which the symbol file may be accessed;
communicating with a remote server associated with the remote location to access the symbol file, including handling authentication of the client by the remote server wherein the symbol file may be accessed;
determining a level of access associated with the authenticated client; and
if the level of access of the authenticated client allows retrieval of the symbol file, obtaining access to the symbol file at the remote location.

2. The method of claim 1 wherein determining a remote location at which the symbol file may be accessed includes constructing at least part of a network path based on information associated with the file.

3. The method of claim 1 wherein the information associated with the file includes time / date stamp data and size data.

4. The method of claim 1 wherein the information associated with the file includes signature and age data.

5. The method of claim 1 wherein handling authentication of the client includes, communicating with cryptographic software to obtain a digital certificate.

6. The method of claim 5 wherein the cryptographic software obtains the digital certificate from a smart card.

7. The method of claim 1 further comprising, downloading the symbol file to the client.

8. The method of claim 1 further comprising, communicating with a remote server to obtain access to a source code file associated with the symbol file.

9. A computer-readable medium having computer executable instructions for performing the method of claim 1.

10. In a computer network, a system comprising:
a symbol-based tool on a client machine;
a client authentication service on the client machine;
a symbol server on the client machine and connected for communication with the symbol-based tool and the client authentication service; and
the symbol server communicating with the symbol-based tool to receive a request for a remotely located symbol file during a debugging operation, the symbol server:
constructing a network path to the remotely located symbol file based on information associated with the remotely located symbol file;
attempting to access the remotely located symbol file via the path;
communicating with the client authentication service and with a remote server on the network path to authenticate the client at the remote server and to determine if a level of access associated with the authenticated client allows retrieval of the remotely located symbol file; and
obtaining access to the remotely located symbol file.

11. The system of claim 10 wherein the symbol-based tool comprises a debugging tool.

12. The system of claim 11 further comprising, a mechanism at the client machine configured to determine a network path to a source code file that corresponds to the remotely located symbol file.

13. The system of claim 10 wherein the client authentication service comprises a cryptographic service provider.

14. The system of claim 13 wherein the cryptographic service provider is connected for reading a smart card.

15. The system of claim 13 wherein the cryptographic service provider provides a digital certificate to the symbol server.

16. The system of claim 10 wherein the symbol server constructs a network path to the remotely located symbol file based on metadata associated with the file.

17. The system of claim 10 wherein the symbol server constructs a network path to the remotely located symbol file based on time / date stamp data associated with the file.

18. The system of claim 10 wherein the symbol server constructs a network path to the remotely located symbol file based on size data associated with the file.

19. The system of claim 10 wherein the symbol server constructs a network path to the remotely located symbol file based on age data associated with the file.

20. The system of claim 10 wherein the symbol server constructs a network path to the remotely located symbol file based on signature data associated with the file.

21. A computer-implemented method, comprising,
maintaining symbol files via a remote server, each symbol file having a unique network path thereto that may be derived from parameters associated with that file, including at least one of a time / date stamp data, size data, age data or signature data;
receiving, from a client, a request for access to at least one selected symbol file via a respective network path during a debugging operation;
determining, at the remote server, whether access to the selected symbol file should be granted, including authenticating the client by the remote server and determining a level of access associated with the authenticated client, and if the associated level of access allows retrieval of the symbol file, determining that access should be granted, and allowing access to the selected symbol file.

22. The method of claim 21 wherein authenticating the client includes issuing a challenge to the client.

23. The method of claim 21 wherein authenticating the client includes receiving a digital certificate from the client, and communicating with a certificate authority.

24. The method of claim 21 wherein authenticating the client includes comparing an identifier of the client against access control information associated with the selected file.

25. The method of claim 21 further comprising, constructing at the client machine a unique network path to a selected symbol file based on at least one of the parameters.

* * * * *